United States Patent
Wu et al.

(10) Patent No.: US 8,208,244 B2
(45) Date of Patent: *Jun. 26, 2012

(54) TILTING PORTABLE ELECTRONIC DEVICE

(75) Inventors: Kun-Tsan Wu, Shindian (TW);
Wei-Shan Hu, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 80 days.

This patent is subject to a terminal disclaimer.

(21) Appl. No.: 12/825,474

(22) Filed: Jun. 29, 2010

(65) Prior Publication Data

US 2011/0170245 A1    Jul. 14, 2011

(30) Foreign Application Priority Data

Jan. 13, 2010    (CN) .......................... 2010 1 0300249

(51) Int. Cl.
*G06F 1/16* (2006.01)
(52) U.S. Cl. ................ 361/679.01; 312/309; 455/115.3; 345/440
(58) Field of Classification Search ................. 455/11.1, 455/575.1, 575.3, 575.8, 556.2, 115.3; 345/173, 345/157, 168, 170, 440; 16/434, 284, 280; 312/265.4, 212, 309; 361/748, 679.01, 679.55, 361/679.14, 679.27, 679.57, 679.03, 679.56, 361/679.08, 679.12; 425/450.1
See application file for complete search history.

(56) References Cited

U.S. PATENT DOCUMENTS

| | | | |
|---|---|---|---|
| 6,877,425 B2 * | 4/2005 | Lynton ........................... | 101/333 |
| 2011/0156559 A1 * | 6/2011 | Wu et al. ....................... | 312/309 |
| 2011/0157784 A1 * | 6/2011 | Wu et al. .................. | 361/679.01 |
| 2011/0176262 A1 * | 7/2011 | Wu et al. .................. | 361/679.01 |

* cited by examiner

*Primary Examiner* — Hung Duong
(74) *Attorney, Agent, or Firm* — Altis Law Group, Inc.

(57) ABSTRACT

A tilting portable electronic device includes a main body, a cover having a sliding plate, a sliding mechanism connecting to the main body and the cover respectively. The sliding mechanism includes a first plate secured to the main body, a second plate slidably engaging with the first plate, two connecting bars and two swing arms. The connecting bars rotatably connect with the second plate and the sliding plate, the swing arms rotatably connect with the main body and the connecting bar. When the sliding plate is pushed and slides relative to the main body, the connecting bars slides, the first plate correspondingly slides relative to the second plate, and the swing arms rotates to support an end of the cover.

13 Claims, 7 Drawing Sheets

TILTING PORTABLE ELECTRONIC DEVICE

CROSS-REFERENCE TO RELATED APPLICATIONS

This application is one of the eight related co-pending U.S. patent applications listed below. All listed applications have the same assignee and were concurrently filed herewith. The disclosure of each of the listed applications is incorporated by reference into all the other listed applications.

| Ser. No. | Title | Inventors |
| --- | --- | --- |
| 12/825,459 | TILTING PORTABLE ELECTRONIC DEVICE | Kun-Tsan Wu et al. |
| 12/825,462 | TILTING PORTABLE ELECTRONIC DEVICE | Kun-Tsan Wu et al. |
| 12/825,471 | TILTING PORTABLE ELECTRONIC DEVICE | Kun-Tsan Wu et al. |
| 12/825,474 | TILTING PORTABLE ELECTRONIC DEVICE | Kun-Tsan Wu et al. |
| 12/825,477 | TILTING PORTABLE ELECTRONIC DEVICE | Kun-Tsan Wu et al. |
| 12/825,483 | TILTING PORTABLE ELECTRONIC DEVICE | Kun-Tsan Wu et al. |
| 12/825,484 | TILTING PORTABLE ELECTRONIC DEVICE | Kun-Tsan Wu et al. |
| 12/825,488 | TILTING PORTABLE ELECTRONIC DEVICE | Kun-Tsan Wu et al. |

BACKGROUND

1. Technical Field

The present disclosure relates to tilting portable electronic devices.

2. Description of Related Art

Conventional portable electronic device can be classified as bar-type devices, rotating-type devices and sliding-type devices. The bar-type device has a housing secured with a cover. The rotating-type device includes a housing and a cover rotatably attached to the housing about a single axis. The sliding-type device has a housing and a cover slidably attached to the housing.

However, those kinds of electronic devices have the following problems. When a user wants to watch a display of the electronic device resting on a table, it is desirable to have an additional support for supporting the electronic device in a slanting position. Alternatively, the user may grip and tilt the electronic device with his hands, however, it might be not comfortable for long periods of time.

Therefore, there is room for improvement within the art.

BRIEF DESCRIPTION OF THE DRAWINGS

Many aspects of the present tilting portable electronic device can be better understood with reference to the following drawings. The components in the various drawings are not necessarily drawn to scale, the emphasis instead being placed upon clearly illustrating the principles of the present tilting portable electronic device. Moreover, in the drawings, like reference numerals designate corresponding parts throughout the diagrams.

DETAILED DESCRIPTION

Figure 1:
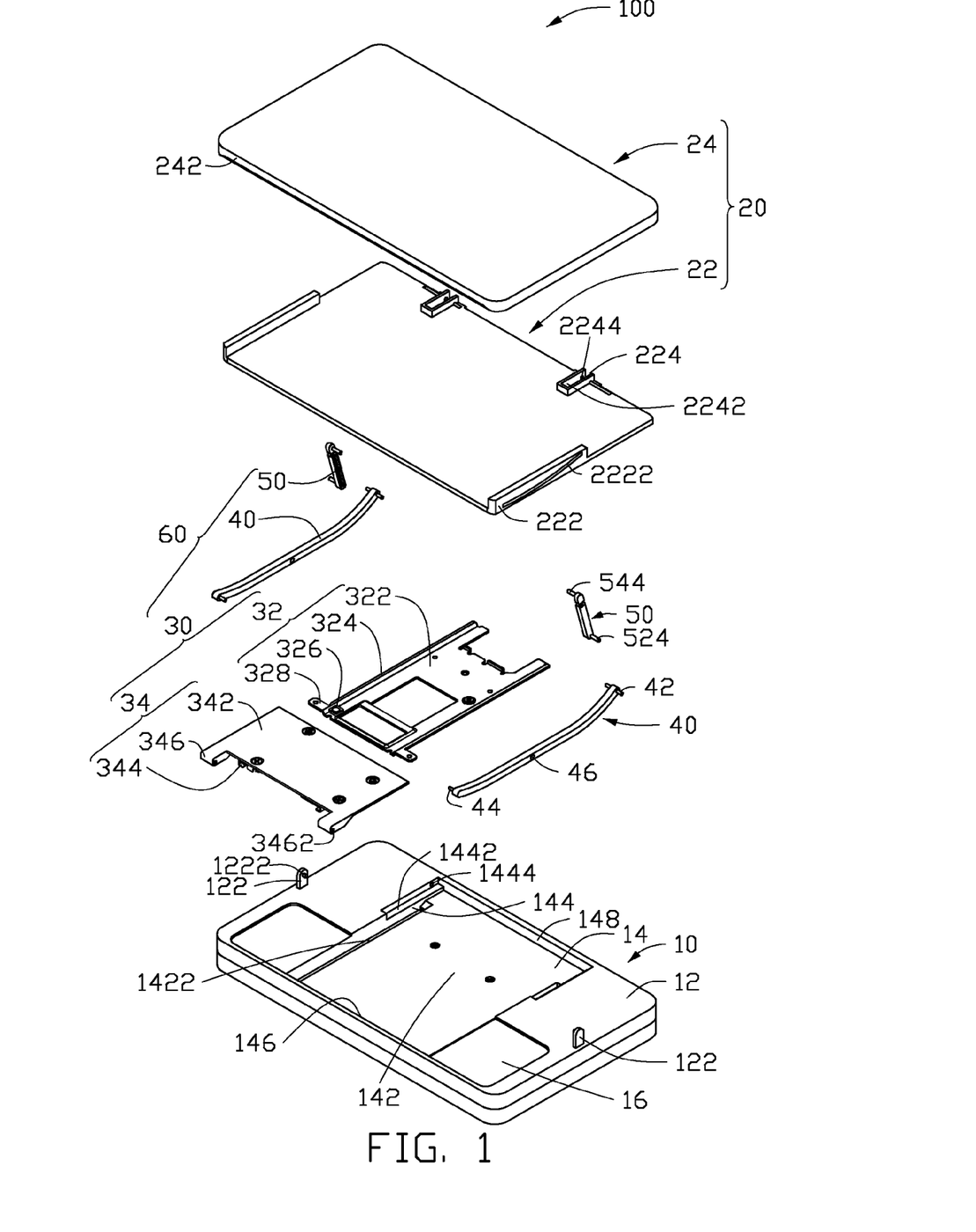
FIG. 1 is an exploded view of a tilting portable electronic device, according to an exemplary embodiment.

FIG. 1 shows a tilting portable electronic device 100, such as mobile phones, personal digital assistants (PDAs), digital cameras, including a main body 10, a cover 20, and a sliding mechanism 60. The sliding mechanism 60 connects the main body 10 and the cover 20 to tilt open the cover 20.

The main body 10 is generally rectangular and has a top surface 12. The top surface 12 has two protrusions 122 protruding from and adjacent to the two sides respectively. Each protrusion 122 has a slide pin 1222 extending laterally towards the other protrusion 122. The top surface 12 has a receiving chamber 14 and a keypad recess 16 crossing on one end of the receiving chamber 14. The receiving chamber 14 engages with the sliding mechanism 60 and is enclosed by a bottom wall 142, two opposite sidewalls 144, a first end wall 146 crossed with the keypad recess 16, and an opposite second end wall 148. The bottom wall 142 defines a receiving groove 1422 adjacent each sidewall 144. The two receiving grooves 1422 extend along the sidewalls 144 from the first end wall 146 to approach the second end wall 148. The sidewalls 144 define opposite two cutouts 1442 adjacent to the second end wall 148. An assembling hole 1444 is defined in the sidewall of each cutout 1442 adjacent the second end wall 148. The keypad recess 16 can receive a keypad therein and the keypad covers a section of the receiving chamber 14.

The cover 20 includes a sliding plate 22 and a top plate 24 detachably secured relative to the sliding plate 22. The sliding plate 22 forms two flanges 222 at two sides and adjacent to an end of the sliding plate 22. Each flange 222 defines an arcuate guiding groove 2222 at the outside surface. The sliding plate 22 defines two assembling notches 224 at the end distal to the two flanges 222. Each assembling notch 224 is defined by two parallel spaced assembling walls 2242. The two assembling walls 2242 define a pair of opposite latching holes 2244. The top plate 24 can be integrally secured with the sliding plate 22, and the top plate 24 can have a display (not shown) thereon.

The sliding mechanism 60 includes a plate assembly 30, two connecting bars 40 and two swing arms 50. The plate assembly 30 includes a first plate 32 and a second plate 34 slidable relative to the first plate 32. The first plate 32 includes a first plate portion 322, two guiding rails 324 formed at two sides, a stopper 326, and two lugs 328. The stopper 326 and the two lugs 328 are located an end of the first plate portion 322. The stopper 326 protrudes from the first plate portion 322 to stop sliding of the second plate 34 after sliding a certain distance. The two opposite lugs 328 laterally extend from the two sides of the first plate portion 322 and used to secure the first plate 32 with the bottom wall 142 of the main body 10.

Figure 2:
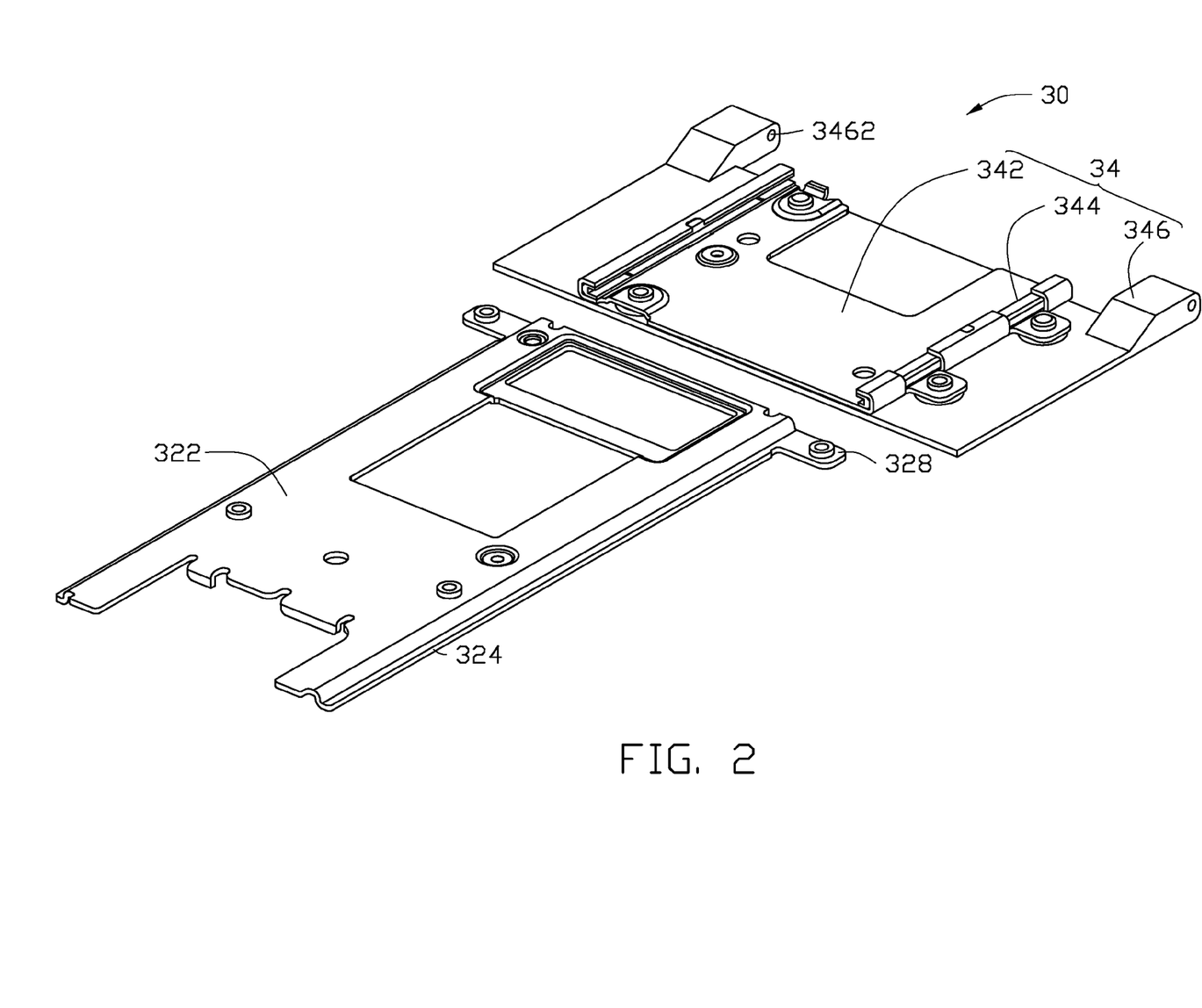
FIG. 2 is a partially disassembled view of a sliding mechanism of the electronic device shown in FIG. 1.

Referring to FIG. 2, the second plate 34 engageable with the first plate is wider than the first plate 32. The second plate 34 includes a second plate portion 342, two guiding grooves 344 oppositely arranged on the second plate portion 342, and two opposite connecting arms 346 extending from opposite ends of the second plate portion 342. The guiding grooves 344 receive the two slidable guiding rails 324 therein. The two connecting arms 346 define two opposite connecting holes 3462 laterally running through the connecting arm 346 to connect the connecting bars 40.

The connecting bar 40 is strip shaped with a tilted end portion. The connecting bar 40 can be received in the receiving groove 1422 of the bottom wall 14. The connecting bar 40 forms a first connecting pin 42 and a second connecting pin 44 at its two ends. The first connecting pin 42 extends laterally from two sides of the connecting bar 40 and engage in opposite latching holes 2244 of the assembling notch 224. The second connecting pin 44 extends from a side of the connecting bar 40 and engages into connecting hole 3462 of the connecting arm 346. The connecting bar 40 defines a middle hole 46 passing through the center. The middle hole 46 is used to connect the swing arm 50 to the connecting bar 40.

Figure 3:
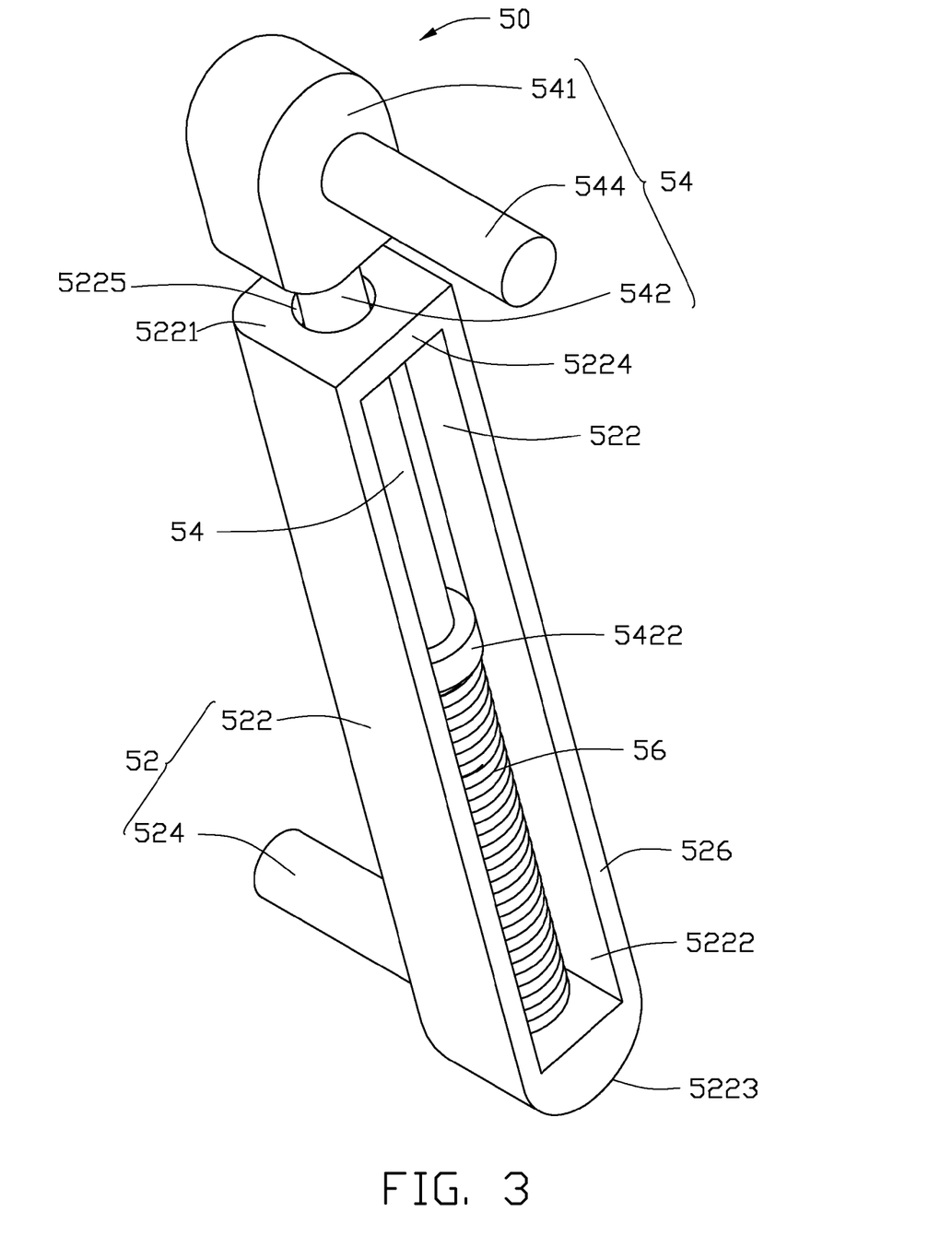
FIG. 3 is a schematic view of a rotating arm shown in FIG. 1.

Referring to FIG. 3, the swing arm 50 can be received in the cutout 1442 of the main body 10. The swing arm 50 includes a sleeve member 52, a resisting member 54, and an elastic member 56. The sleeve member 52 includes a base body 522 and first extending pin 524. The base body 522 is generally pole-shaped and has a planar first end surface 5221 and a spherical second end surface 5223. The base body 522 axially defines an accommodating groove 5222 to assemble the resisting member 54 and the elastic member 56, accordingly, forming a connecting wall 5224 having the first end surface 5221. The connecting wall 5224 axially defines a through hole 5225 communicating with the accommodating groove 5222 to engage in the resisting member 54. The first extending pin 524 protrudes laterally from adjacent to the second end surface 5223 and engages the assembling hole 1444 of the main body 10.

The resisting member 54 includes a main portion 541, a post 542 extending from the bottom of main portion 541, and a second extending pin 544 extending from a side of the main portion 541. The post 542 can pass through the through hole 5225, with the distal end of the post 542 has a loop 5422 secured therein. The second extending pin 544 extends in a direction opposite to the extending direction of the first extending pin 524 and engages the middle hole 46 of the connecting bar 40.

The elastic member 56 is a coiled spring assembled in the accommodating groove 5222 for resisting against the post 542 to push the post 542 to slide toward the connecting wall 5224.

Figure 4:
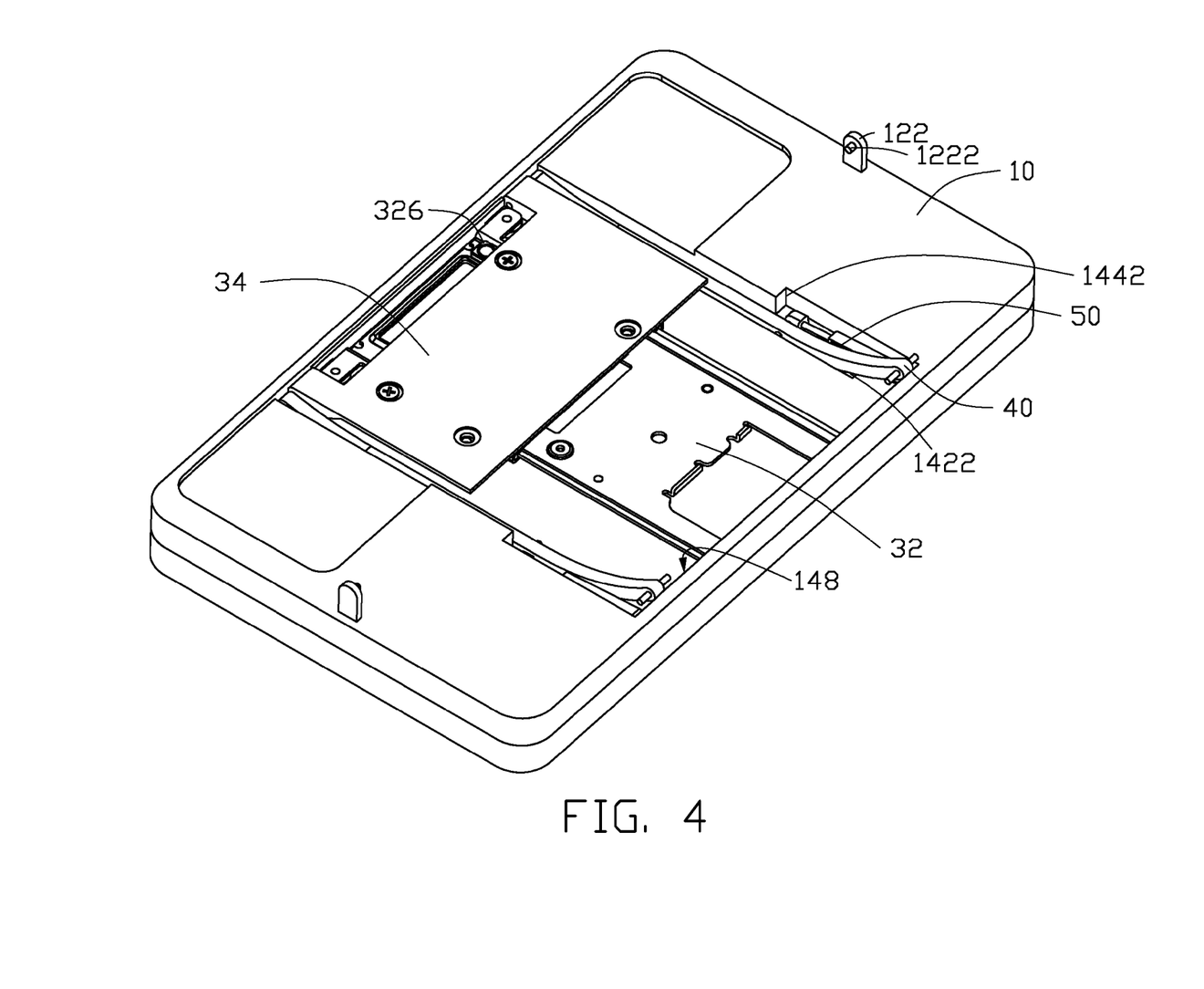
FIG. 4 is an assembled schematic view of the electronic device shown in FIG. 1 without a cover.
Figure 5:
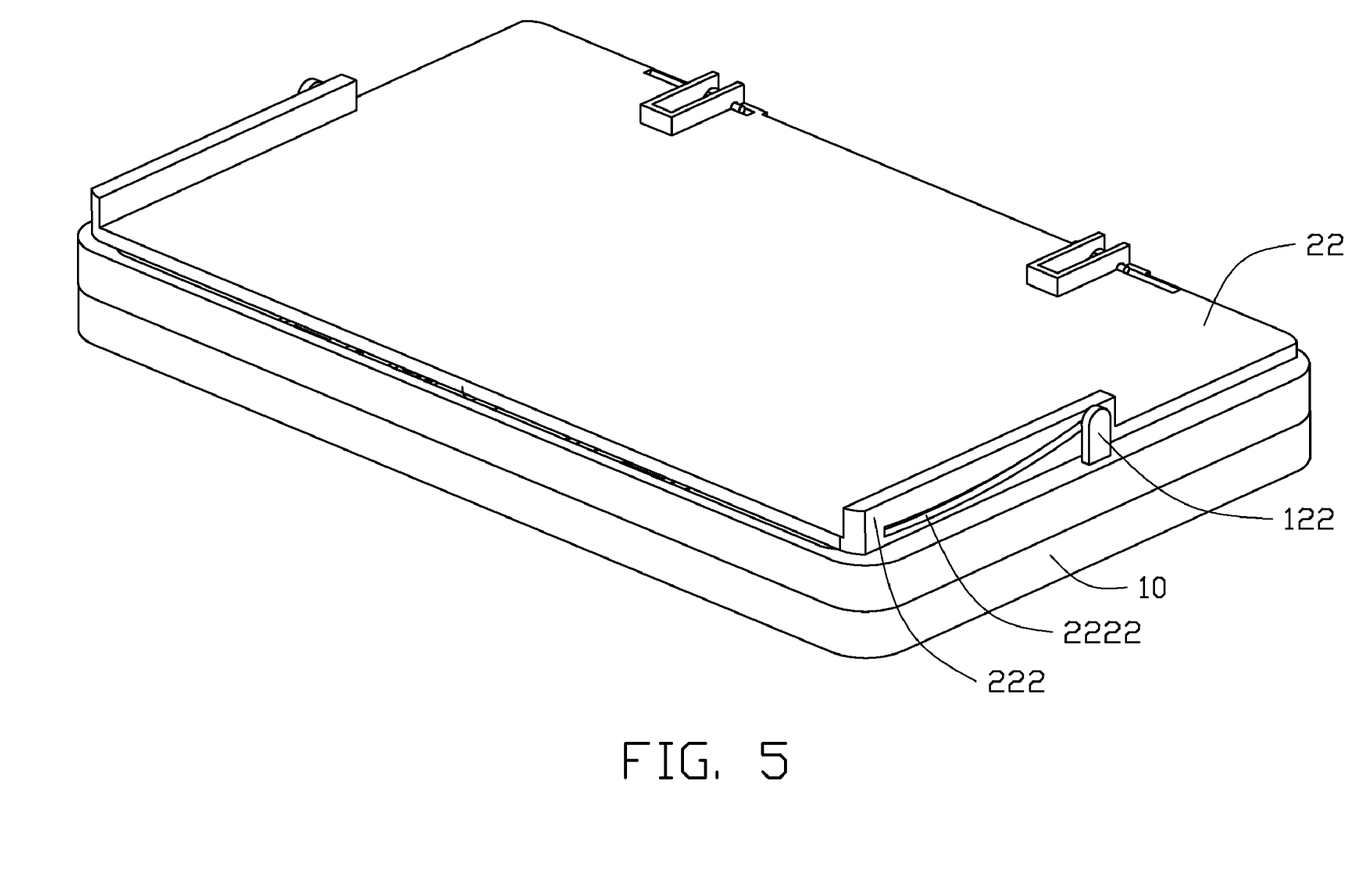
FIG. 5 is an assembled schematic view of the electronic device shown in FIG. 1 without a top plate.

Referring to FIGS. 4 and 5, during installation of the tilting portable electronic device 100, the first plate 32 of the plate assembly 30 is secured on the bottom wall 142 of the main body 10. The second plate 34 engages with the first plate 32, and the guiding grooves 344 of the second plate 34 slidably receive the two guiding rails 324 therein. The connecting bars 40 are assembled with the second plate 34, and the second connecting pin 44 of each connecting bar 40 is correspondingly inserted into the connecting hole 3462 of the connecting arm 346. The connecting bars 40 are respectively positioned in the receiving grooves 1422 of the main body 10 with the tilted end portion of the connecting bar 40 exposed from the receiving groove 1422. Then, the two swing arms 50 can be installed in the cutout 1442 of the main body 10 with the first extending pin 524 of each swing arm 50 engaging in the assembling hole 1444 of the main body 10, and the second extending pin 544 engaging in the middle hole 46 of the connecting bar 40. During this process, the elastic member 56 is extended to a maximum. A keypad can be assembled in the keypad recess 16.

To assemble the cover 20, the sliding plate 22 is mounted on the top surface 12 of the main body 10 with the first connecting pin 42 of each connecting bar 40 engaging in opposite latching holes 2244 of the sliding plate 22. The slide pins 1222 of the main body 10 are inserted into the two guiding groove 2222 of the sliding plate 22. Accordingly, the sliding plate 22 is assembled on the main body 10. The top plate 24 is secured on the sliding plate 22 by such means as latching. Therefore, the tilting portable electronic device 100 is installed.

Figure 6:
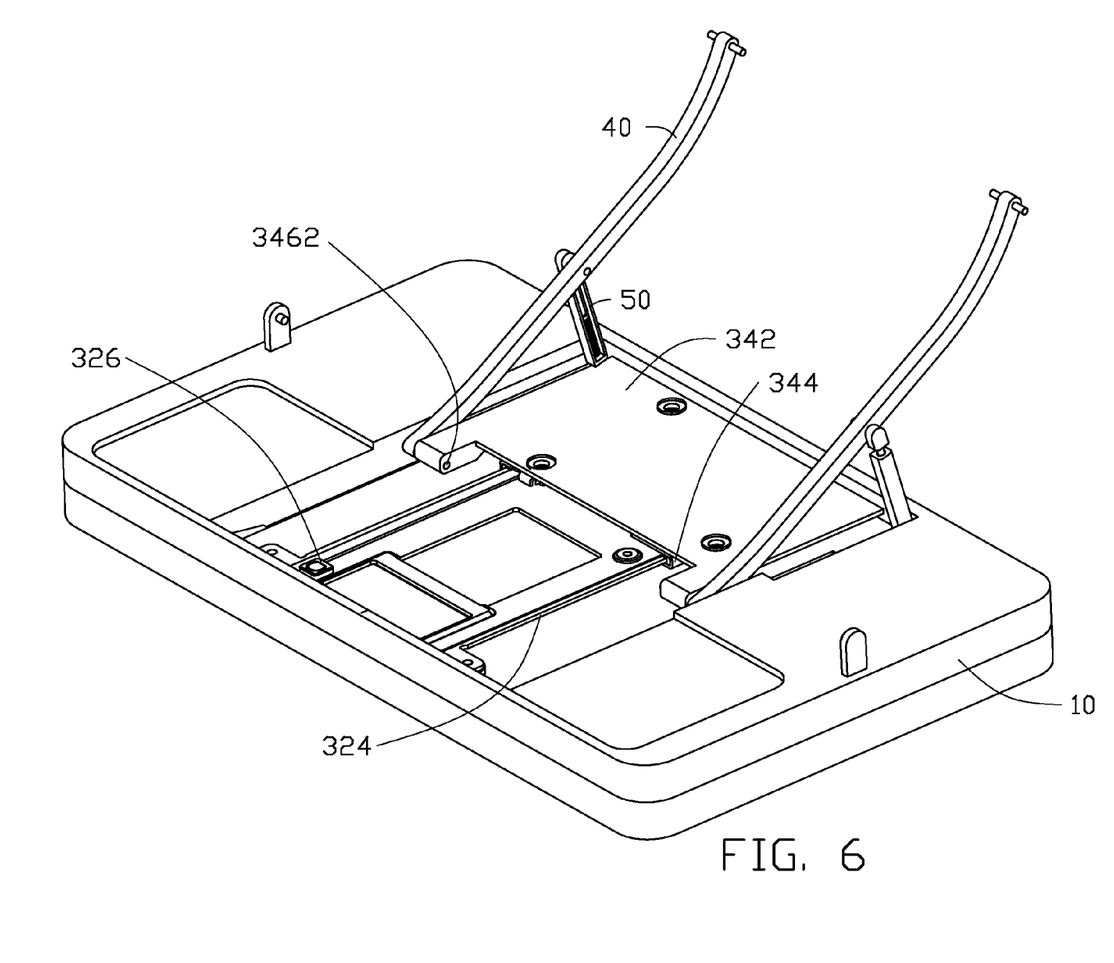
FIG. 6 is an opened schematic view of the tilting portable electronic device shown in FIG. 1 without the cover body.
Figure 7:
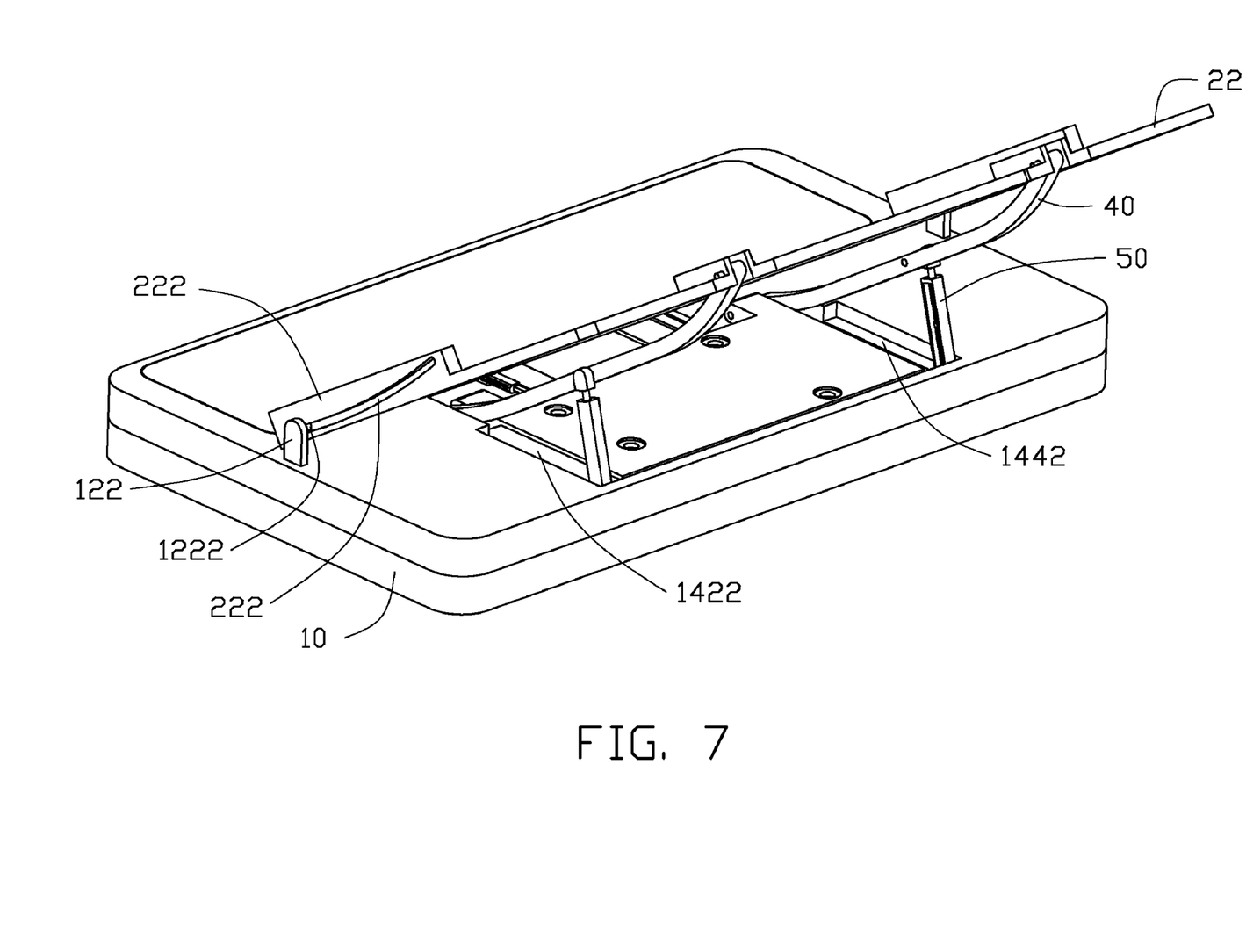
FIG. 7 is an opened schematic view of the electronic device shown in FIG. 1 without the top plate.

FIGS. 6 and 7 shows an opening of the sliding plate 22. The sliding plate 22 can be pushed to slide with the sliding plate 22 carrying the two connecting bars 40 and the second plate 34 slide together. Due to the connection between the swing arm 50 and the connecting bar 40, the post 542 of the resisting member 54 withdraws into the accommodating groove 5222 and the elastic member 56 is compressed. At the same time, the swing arms 50 rotate and tilt an end of the sliding plate 22. Beginning after the elastic members 56 are maximally compressed, further rotation of the swing arms 50 drives the elastic members 56 to release their potential energy to make the sliding plate 22 to slide automatically, until the second plate 34 resists against the second end wall 148 of the main body 10. Due to the slide pin 1222 of the main body 10 inserting into and sliding along the guiding groove 2222, the other end of the sliding plate 22 attaches and slides along the top surface 12, and the sliding plate 22 is opened at a slant relative to the top surface 12 of the main body 10.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A tilting portable electronic device, comprising:
a main body;
a cover having a sliding plate;
a sliding mechanism connecting to the main body and the cover respectively;
wherein the sliding mechanism includes a first plate secured to the main body, a second plate slidably engaging with the first plate, two connecting bars and two swing arms; the connecting bars rotatably connect with the second plate and the sliding plate, the swing arms rotatably connect with the main body and the connecting bar; when the sliding plate is pushed and slides relative to the main body, the connecting bars slides, the first plate correspondingly slides relative to the second plate, and the swing arms rotates to tiltedly support an end of the sliding plate.

2. The tilting portable electronic device as claimed in claim 1, wherein the main body includes a top surface, the top surface has two opposite protrusions, each protrusion forms a slide pin, the sliding plate forms a flange at each side, each flange defines a guiding groove to receive the slide pin.

3. The tilting portable electronic device as claimed in claim 2, wherein the top surface defines a receiving chamber to receive the sliding mechanism, the bottom of the receiving chamber defines two receiving grooves to receive the connecting bars.

4. The tilting portable electronic device as claimed in claim 2, wherein the sidewall of the receiving chamber defines cutouts to receive the swing arm.

5. The tilting portable electronic device as claimed in claim 1, wherein the sliding plate defines an assembling notches to rotatably connect to an end of each connecting bar.

6. The tilting portable electronic device as claimed in claim 1, wherein the second plate forms two opposite connecting arms, the two connecting arms define oppositely two connecting holes to connect to each end of each connecting bar.

7. The tilting portable electronic device as claimed in claim 1, wherein the connecting bar defines a middle hole to connect an end of the swing arm.

8. The tilting portable electronic device as claimed in claim 1, wherein the swing arm includes a sleeve member, a resisting member and an elastic member, the sleeve member defines an accommodating groove to assemble the resisting member and the elastic member, the elastic member resists against the resisting member.

9. The tilting portable electronic device as claimed in claim 8, wherein the sleeve member includes a base body and a first extending pin extending from the base body, the base body axially defines the accommodating groove, the first extending pin rotatably engage into the main body.

10. The tilting portable electronic device as claimed in claim 9, wherein the base body has a connecting wall, the connecting wall defines a through hole communicating with the accommodating groove, the resisting member includes a post pass through the through hole with the distal end of the post resists against the elastic member.

11. The tilting portable electronic device as claimed in claim 9, wherein the elastic member is a coiled spring.

12. The tilting portable electronic device as claimed in claim 1, wherein the first plate includes a first plate portion and a guiding rail formed at each side, the second plate includes a second plate portion and two guiding grooves oppositely arranged on the second plate portion to receive the two guiding rails respectively.

13. The tilting portable electronic device as claimed in claim 1, wherein the connecting bar is a strip shaped with a tilted end portion.

* * * * *